(12) United States Patent
Büchel et al.

(10) Patent No.: US 12,209,687 B2
(45) Date of Patent: Jan. 28, 2025

(54) CLOSURE DEVICE FOR CLOSING AN OPENING IN A WALL IN A VACUUM-TIGHT MANNER

(71) Applicant: VAT Holding AG, Haag (CH)

(72) Inventors: Fabian Büchel, Buchs SG (CH); Florian Ehrne, Frümsen (CH)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 18/273,324

(22) PCT Filed: Jan. 24, 2022

(86) PCT No.: PCT/EP2022/051472
§ 371 (c)(1),
(2) Date: Jul. 20, 2023

(87) PCT Pub. No.: WO2022/161909
PCT Pub. Date: Aug. 4, 2022

(65) Prior Publication Data
US 2024/0309970 A1    Sep. 19, 2024

(30) Foreign Application Priority Data

Feb. 1, 2021 (DE) .......................... 102021102283.5

(51) Int. Cl.
*F16K 51/02* (2006.01)
*F16K 1/36* (2006.01)
*F16K 1/48* (2006.01)

(52) U.S. Cl.
CPC ............... *F16K 51/02* (2013.01); *F16K 1/36* (2013.01); *F16K 1/48* (2013.01); *F16K 2200/101* (2021.08)

(58) Field of Classification Search
CPC ... F16K 51/02; F16K 1/48; F16K 1/34; F16K 1/36; F16K 2200/101; F16K 2200/10
See application file for complete search history.

(56) References Cited

U.S. PATENT DOCUMENTS 2,848,187 A * 8/1958 Henry ................... F16K 1/20
 251/86
3,344,807 A * 10/1967 Lehrer ................... F16K 51/02
 137/614.19
(Continued)

FOREIGN PATENT DOCUMENTS

CH 694279 A5 * 10/2004 ............... F16K 1/48
CH 699258 B1 2/2010
(Continued)

OTHER PUBLICATIONS

VAT Vakuumventile AG, Construction plans of a vacuum valve (Apr. 4, 2007).

*Primary Examiner* — David Colon-Morales
(74) *Attorney, Agent, or Firm* — Volpe Koenig

(57) ABSTRACT

A closure device for closing an opening in a wall in a vacuum-tight manner has a valve plate, which by way of a connecting device is connected to a valve rod, for closing and exposing the opening. The connecting device has a swivel head of which at least portions of the external surface are of a spherical configuration and which is disposed in a receptacle space of a joint body. For blocking a rotation of the swivel head about the longitudinal axis of the valve rod, at least one projecting stud, that is disposed on the swivel head or joint body, protrudes into an assigned groove which is disposed in the other one of these two parts and which in a central position of the connecting device extends in a plane that lies parallel to the longitudinal axis of the valve rod.

15 Claims, 6 Drawing Sheets

(56) References Cited

U.S. PATENT DOCUMENTS

| | | | |
|---|---|---|---|
| 3,837,617 A | 9/1974 | Eminger et al. | |
| 4,071,011 A | 1/1978 | Oertle | |
| 4,742,845 A * | 5/1988 | Capoccia | F02M 69/54 251/87 |
| 5,226,632 A * | 7/1993 | Tepman | H01L 21/67126 137/315.27 |
| 5,363,872 A * | 11/1994 | Lorimer | F16K 1/10 414/217 |
| 5,385,334 A * | 1/1995 | Greenwood | F16K 1/10 251/332 |
| 5,738,333 A * | 4/1998 | Cognevich | F16K 17/105 137/489.5 |
| 6,032,419 A * | 3/2000 | Hurwitt | H01L 21/67126 137/1 |
| 6,698,719 B2 * | 3/2004 | Geiser | F16K 1/46 251/332 |
| 6,796,545 B2 * | 9/2004 | Enzaki | F16K 25/00 251/363 |
| 6,805,152 B2 * | 10/2004 | Kanzaka | F16K 31/122 137/341 |
| 7,007,919 B2 | 3/2006 | Blonigan et al. | |
| 7,134,642 B2 | 11/2006 | Seitz | |
| 7,168,676 B2 * | 1/2007 | Kajitani | F16K 31/1225 251/285 |
| 7,396,001 B2 | 7/2008 | Geiser | |
| 7,401,760 B2 * | 7/2008 | Kanzaka | F16K 1/48 251/63 |
| 7,658,367 B2 | 2/2010 | Geiser | |
| 7,798,467 B2 * | 9/2010 | Sakurai | F16K 51/02 251/63.5 |
| 8,196,893 B2 * | 6/2012 | Grout | F16K 15/148 251/63 |
| 8,424,843 B2 | 4/2013 | Ehrne | |
| 9,206,919 B2 | 12/2015 | Neumeister et al. | |
| 10,072,760 B2 | 9/2018 | Kajio | |
| 10,260,655 B2 | 2/2019 | Kim | |
| 10,571,029 B2 * | 2/2020 | Kajio | F16K 1/36 |
| 10,876,639 B2 | 12/2020 | Shimoda et al. | |
| 10,895,331 B2 * | 1/2021 | Enzaki | F16K 1/523 |
| 11,326,699 B2 * | 5/2022 | Blecha | F16K 3/314 |
| 11,506,294 B2 * | 11/2022 | Sato | F16K 41/12 |
| 2002/0033462 A1 * | 3/2002 | Kajitani | F16K 1/38 251/118 |
| 2002/0130288 A1 | 9/2002 | Duelli | |
| 2002/0134441 A1 * | 9/2002 | Kusumoto | F16K 51/02 137/625.3 |
| 2006/0011140 A1 | 1/2006 | Blahnik et al. | |
| 2007/0007475 A1 * | 1/2007 | Zvokelj | F16K 31/122 251/63.6 |
| 2010/0012878 A1 | 1/2010 | Duelli | |
| 2011/0108750 A1 | 5/2011 | Ehre et al. | |
| 2011/0290340 A1 | 12/2011 | Ishigaki et al. | |
| 2012/0267556 A1 | 10/2012 | Shimoda et al. | |
| 2018/0156339 A1 | 6/2018 | Kim et al. | |
| 2019/0211936 A1 | 7/2019 | Shimoda et al. | |
| 2020/0096133 A1 | 3/2020 | Zickar | |
| 2020/0318235 A1 | 10/2020 | Kollberg et al. | |
| 2021/0231223 A1 | 7/2021 | Blecha | |
| 2024/0093787 A1 * | 3/2024 | Buchel | F16K 1/34 |

FOREIGN PATENT DOCUMENTS

| | | | |
|---|---|---|---|
| DE | 102006016510 B4 | 1/2012 | |
| DE | 102015213298 | 1/2017 | |
| DE | 102015213298 A1 * | 1/2017 | |
| EP | 0453867 A1 | 10/1991 | |
| EP | 1197993 A1 | 4/2002 | |
| EP | 3287681 A1 * | 2/2018 | F16K 1/126 |
| JP | S6376918 | 4/1988 | |
| KR | 200476559 Y1 * | 3/2015 | |
| KR | 20180021561 A * | 3/2018 | |
| WO | WO-0074124 A1 * | 12/2000 | C23C 16/54 |
| WO | 2011091455 | 8/2011 | |
| WO | 2022/161966 A1 | 8/2022 | |

* cited by examiner

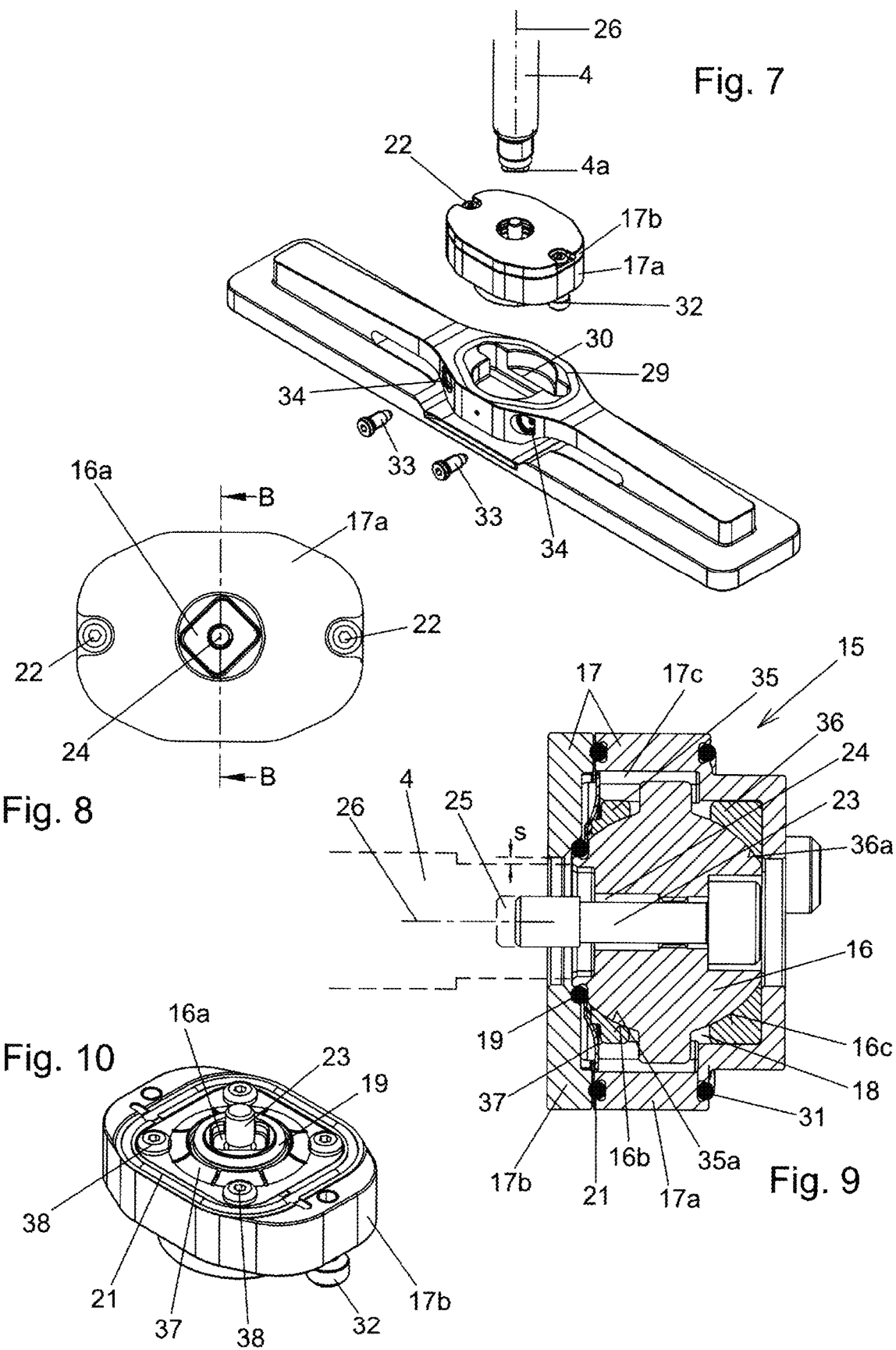

CLOSURE DEVICE FOR CLOSING AN OPENING IN A WALL IN A VACUUM-TIGHT MANNER

CROSS-REFERENCE TO RELATED APPLICATION

This application is the U.S. National Phase of PCT Appln. No. PCT/EP2022/051472, filed Jan. 24, 2022, which claims priority from German Patent Application No. 10 2021 102 283.5, filed Feb. 1, 2021, the entire disclosures of which are incorporated by reference herein.

TECHNICAL FIELD

The invention relates to a closure device for closing an opening in a wall in a vacuum-tight manner, having a valve plate which is adjustable between a closed position in which the valve plate seals the opening and an opened position in which the valve plate exposes the opening, and which by way of a connecting device is connected to a valve rod of the closure device that has a longitudinal axis, wherein the connecting device has a swivel head of which at least portions of the external surface are of a spherical configuration and which is disposed in a receptacle space of a joint body.

BACKGROUND

It is known for a threaded connection to be provided for fastening a valve plate of a vacuum valve to a valve rod. In order to achieve uniform compression of an elastic seal ring, which is disposed between the valve plate and a valve seat for the valve plate, the elastic seal generally being attached to the valve plate, in the closed state of the vacuum valve despite the prevailing tolerances in the closed state of the vacuum valve, it is moreover known to enable mobility of the valve plate in relation to the valve rod. For example, US 2002/0130288 A1 discloses a connecting device between the valve rod and the valve plate, which has an elastic block that has a force-transmission part disposed in the latter. When the valve plate is pressed against the valve seat, the valve plate can pivot somewhat in relation to the valve rod as a result.

Further connecting devices between a valve plate and a valve rod that permit potential mobility of the valve plate in relation to the valve rod are disclosed in U.S. Pat. Nos. 7,134,642 B2 and 3,837,617.

A connecting device between a valve rod and a valve plate that has a twist-capable traverse is disclosed in US 2011/0108750 A1. A certain degree of pivoting of the valve plate in relation to the valve rod is enabled by twisting the traverse.

A closure device of the type mentioned at the outset is known from prior use. A shaft which is rotatable by a drive motor (which can be considered to be the "valve rod") is connected to the valve plate by way of a swing arm which extends orthogonally to the longitudinal axis of the shaft and which on the end distal from the shaft forms a ball joint to which the valve plate is attached. For this purpose, the swing arm has a socket-shaped clearance in which a swivel head is disposed, one portion of the external surface of the latter being of a spherical configuration. This swivel head interacts with joint socket parts which are placed onto the swivel head from opposite sides and which have in each case a concave joint face in the shape of a portion of a spherical internal surface and which are likewise disposed in the socket-shaped clearance of the swing arm. The joint socket parts are pressed against the swivel head by means of a spring steel sheet which is screwed to the swing arm and which acts on the joint socket part that lies on this side. A through bore through the swivel head is penetrated by a screw which also penetrates an opening in the spring steel sheet, and by way of which the valve plate in the region of the opening of the spring steel sheet is screwed to the swivel head. With a view to the potential mobility of the ball joint about three mutually orthogonal axes, this mounting of the valve plate is suitable only for valve plates with a circular external diameter.

Ball joints are used in various fields of engineering, for example also for the articulated connection between the wheel bearing and the control arm in axle assemblies of motor vehicles. A special ball joint of this type is disclosed in DE 10 2015 213 298 A1. The swivel head here possesses studs which project on both sides and protrude into a respectively assigned groove, wherein the grooves are disposed in lateral walls of a receptacle space of a housing-type joint body. As a result of this configuration, steering moments can be supported on the ball joint.

SUMMARY

It is an object of the invention to provide an advantageous closure device of the type mentioned at the outset, which has a wide field of application. According to the invention, this is achieved by a closure device having the features of claim 1.

Provided for blocking a rotation of the swivel head in relation to the joint body about the longitudinal axis of the valve rod in the closure device according to the invention is at least one projecting stud that is disposed on the swivel head or on the joint body and protrudes into an assigned groove which is disposed on the other one of these two parts. In a central position of the connecting device, in which the valve plate is aligned so as to be orthogonal to the longitudinal axis of the valve rod, this groove extends in a plane that lies parallel to the longitudinal axis of the valve rod. It is preferable here that disposed on opposite sides of the swivel head or joint body is in each case one projecting stud which engages in one respectively assigned groove in the other one of these two parts, said groove in the central position of the connecting device extending in the said plane.

As a result of blocking the rotation of the swivel head in relation to the joint body about the longitudinal axis of the valve rod, the closure device according to the invention is also suitable for a configuration of the valve plate with a shape deviating from the circular shape, in particular an at least substantially rectangular shape (thus a rectangular shape with radiused corners, for example). In this way, the rotational position of the valve plate in relation to the longitudinal axis of the valve rod, and thus also in relation to the axis of the opening that is able to be closed by the valve plate, is fixed, while it is possible to adapt the plane in which the valve plate lies to the plane in which the opening lies, so as to achieve a uniform contact pressure on the valve seat, and thus a circumferentially uniform compression of the seal ring, in the closed position of the valve plate.

The closure device according to the invention can be a vacuum valve that has a valve housing of which one wall has the opening that is able to be closed by the valve plate. Such a valve housing in this instance has a further opening so as to configure a passage duct through the valve housing in the opened position of the valve plate. In a further potential embodiment, the closure device according to the invention can also serve for sealing an opening in a wall of a vacuum chamber. In this embodiment, the wall with the opening that is able to be closed by the valve plate does not form a component part of the closure device according to the invention.

In one advantageous embodiment of the invention, the valve plate is connected to the joint body, and the valve rod is connected to the swivel head, preferably by means of a connecting screw which penetrates a central through bore through the swivel head and is screwed into a threaded bore on that end of the valve rod that is proximal to the end face. A threaded bolt integrally molded on the swivel head would also be conceivable and possible.

The joint body is preferably configured as a housing having a socket part, which possesses a socket-type depression that receives the swivel head, and a cap part which covers the depression and is sealed in relation to the socket part by an intervening seal. The valve rod here favorably penetrates an opening in the cap part of the joint body, wherein an annular gap between the valve rod and the periphery of the opening in the cap part is present in the central position of the connecting device. In this way, particles which are formed in the movement of the swivel head in relation to the joint body can advantageously at least largely be retained in the housing-shaped joint body. It is particularly preferable here for a seal ring, which in a region surrounding the opening of the cap part bears on the inside of the cap part, to be disposed on the swivel head. As a result, the interior of the housing-shaped joint body can be effectively sealed in relation to the surroundings.

In one expedient design embodiment of the invention, a first and a second joint socket part for guiding the swivel head in the joint body are disposed in the joint body. Said parts have in each case a concave joint face in the shape of a portion of a spherical internal surface, wherein the concave joint faces of the joint socket parts interact in each case with one assigned convex joint face of the swivel head. These convex joint faces of the swivel head are formed by portions of the external surface of the swivel head that are configured in the shape of portions of a spherical surface.

It is advantageous here for the first and second joint socket parts to be pressed against the swivel head by at least one spring-elastic element. As a result, the swivel head in its respective position can be held in a friction-fitting manner in relation to the joint socket parts and thus in relation to the joint body. The retaining force holding the swivel head is preferably so great that the torque which is exerted by the valve plate by virtue of its weight can be absorbed without the swivel head being adjusted in relation to the joint body, specifically in any potential spatial arrangement of the closure device. When the closure device is closed for the first time, the valve plate can thus correspondingly align itself in relation to the valve seat, and this alignment is thus advantageously maintained also after the closure device has been opened.

For pressing the joint socket parts against the swivel head in one potential embodiment of the invention, a spring steel sheet can be provided as the spring-elastic element, which lies adjacent to the cap part of the joint body and which is pressed against that joint socket part that is disposed on this side of the swivel head. The other joint socket part can bear on the base area of the socket-shaped depression in the socket part of the joint body.

This spring steel sheet can be fastened to the socket part of the joint body by screws, for example. The spring steel sheet in the region of the opening of the cap part has a corresponding opening which is at least so large that the latter does not protrude into the region of the opening of the cap part (when viewed in the axial direction of the opening in the cap part).

BRIEF DESCRIPTION OF THE DRAWINGS

Further advantages and details of the invention will be explained hereunder with reference to the appended drawing, in which:

FIG. 7 shows an oblique view of the front end of the valve rod, of the connecting device, and of the valve plate, in the disassembled state of these parts;

FIG. 8 shows a view from above onto the connecting device;

FIG. 9 shows a section through the connecting device along the line B-B of FIG. 8, wherein a portion of the valve rod connected to the connecting device is schematically plotted with dashed lines;

FIG. 10 shows an oblique view of the connecting device without the cap part.

The figures are in different scales and to some extent are illustrated in a simplified manner.

DETAILED DESCRIPTION

An exemplary embodiment of a closure device according to the invention is explained hereunder by means of FIGS. 1 to 14.

Figure 1:
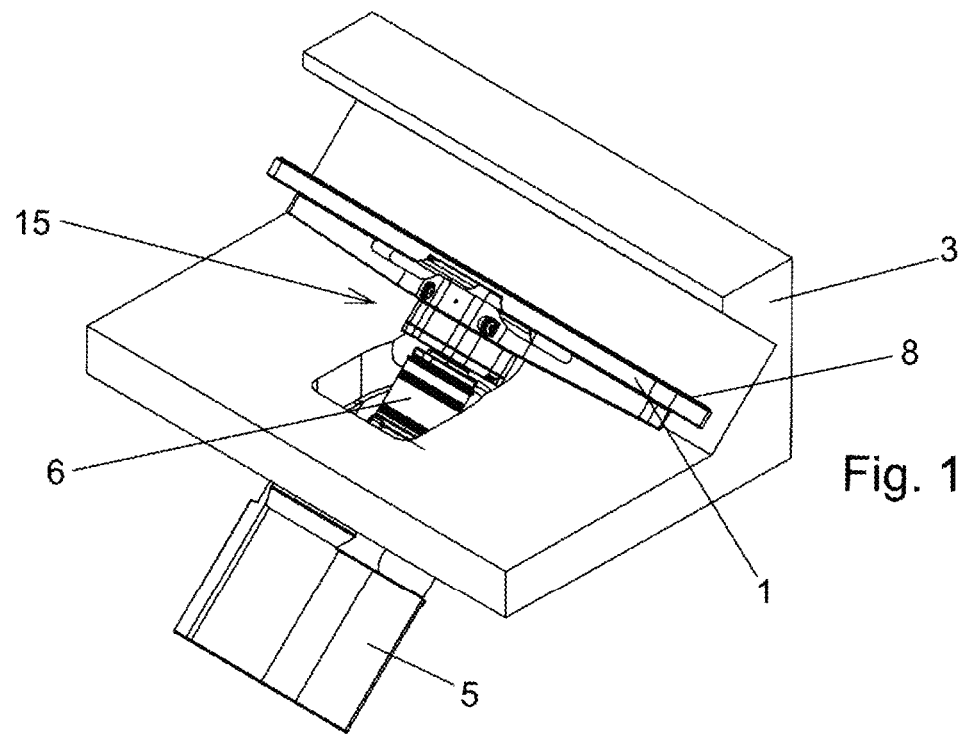
FIG. 1 shows an oblique view of an exemplary embodiment of a closure device according to the invention in the opened position of the valve plate.
Figure 2:
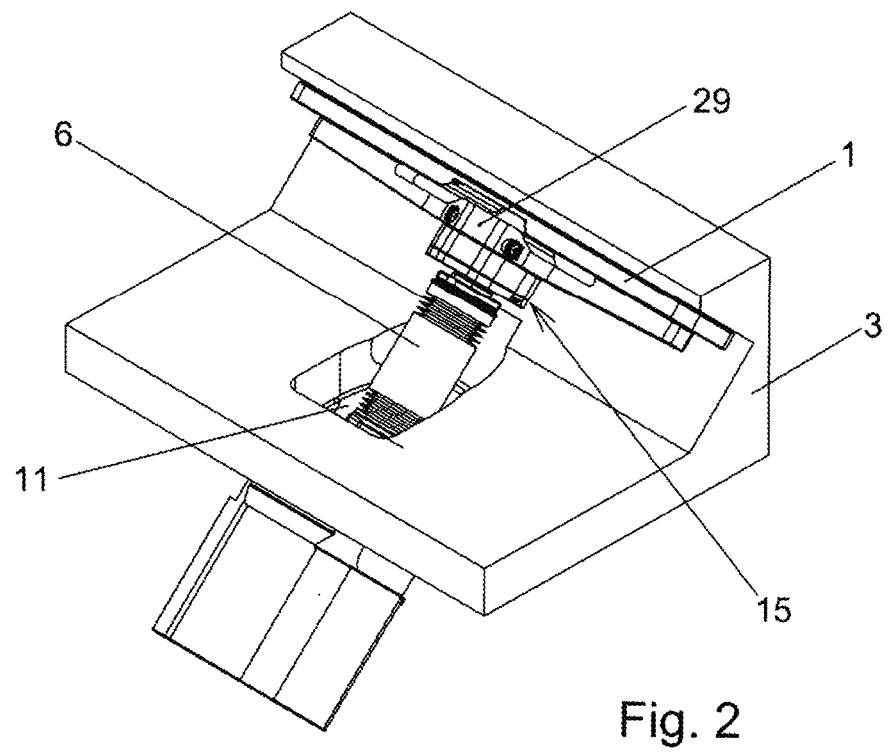
FIG. 2 shows an oblique view analogous to that of FIG. 1, in the closed position of the valve plate.
Figure 3:
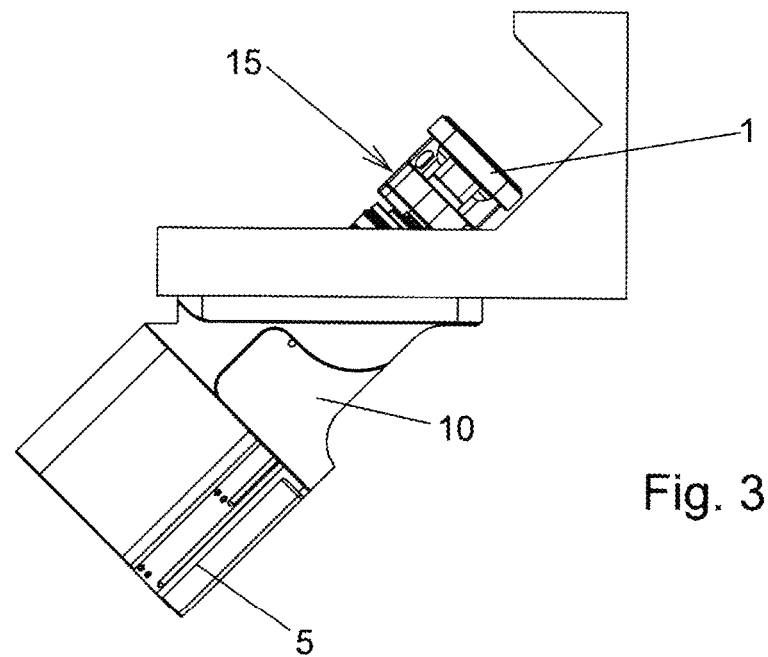
FIGS. 3 and 4 show a lateral view and a view of the closure device in the opened position of the valve plate.
Figure 4:
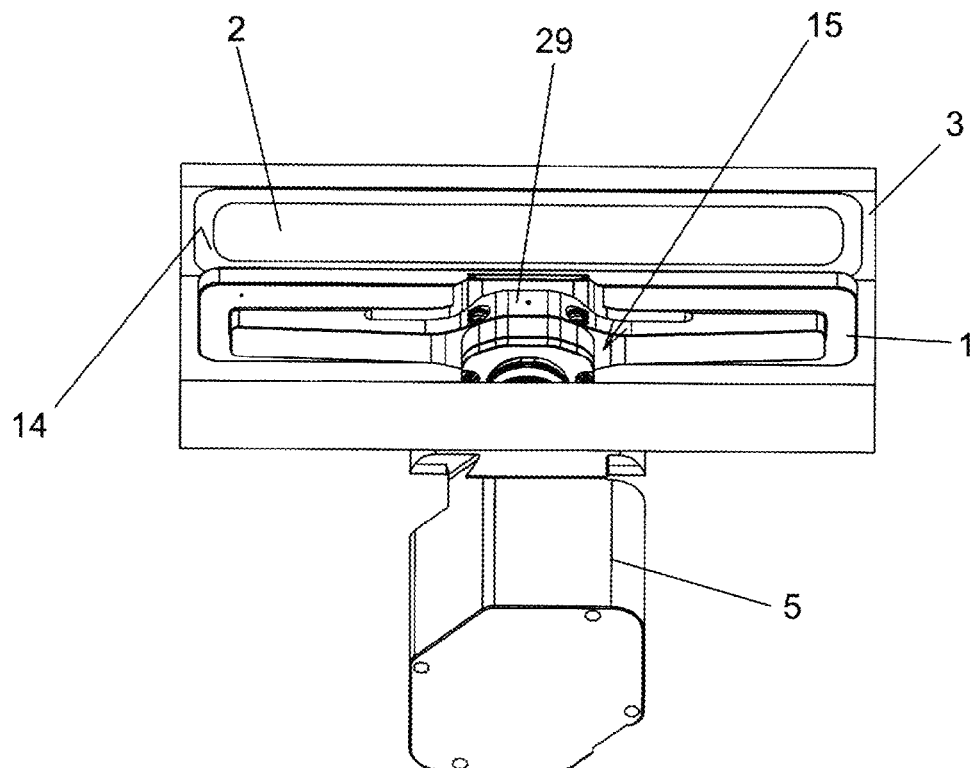

The closure device has a valve plate 1 which is adjustable between an opened position (FIG. 1) and a closed position (FIG. 2). In the opened position of the valve plate, an opening 2 in a wall 3 is exposed; the opening 2 is closed in a vacuum-tight manner by the valve plate 1 in the closed position.

Vacuum-tight closing is understood to mean a leakage rate Q of at least less than $10^{-4}$ mbar l/s.

The valve plate 1 is supported by a valve rod 4 having a longitudinal axis 26. In the exemplary embodiment, the adjustment of the valve plate 1 between the opened position and the closed position is performed only by an axial adjustment of the valve rod 4. In modified embodiments of the invention, the valve plate could also be adjusted between the opened position and the closed position in the manner of an L-movement or J-movement, for example by an axial displacement and subsequent tilting of the valve rod or subsequent displacement of the valve rod orthogonal to the longitudinal axis of the latter, as is known.

A drive 5, which in the exemplary embodiment is formed by a pneumatic piston-and-cylinder unit, serves for adjusting the valve rod 4, so as to adjust the valve plate 1 between the opened position and the closed position. The valve rod 4 is connected to the piston rod of this piston-and-cylinder unit, or is configured so as to be integral to the latter.

A seal ring 8 from an elastomer material serves for sealing between the valve plate 1 and the wall 3 in the closed state of the closure device. Said seal ring 8 in the exemplary embodiment is attached to the valve plate 1, as is preferable. The opening 2 in the wall 3 is surrounded by a seal face which forms the seal seat on which the seal ring 8 bears in the closed position of the valve plate 1. In principle, a reversed arrangement (seal ring on the wall 3, seal face on the valve plate 1) is also conceivable and possible.

The wall 3 can be part of a valve housing which is only partially illustrated in each of FIGS. 1 to 4. The remaining part of the valve housing is indicated by dashed lines in FIG. 5. This valve housing thus has an interior in which the valve plate 1 is disposed. Moreover, such a valve housing has a second opening 9, which is likewise indicated in FIG. 5, for example opposite the opening 2, so as to configure a passage duct through the valve housing in the opened position of the valve plate 1. In this exemplary embodiment, the closure device thus also comprises the valve housing having the wall 3 with the opening 2, forming a vacuum valve.

The valve housing possesses a further opening 11 through which the valve rod 4 is guided out of the interior of the valve housing. This opening 11 is closed in a vacuum-tight manner by a connector piece 10 to which the drive 5 is attached, wherein the valve rod 4 penetrates a passage duct through the connector piece 10 and is axially guided by the latter. An annular seal 12 serves for sealing between the valve housing and the connector piece 10. In the exemplary embodiment, a bellows 6 serves for sealing the valve rod 4 in relation to the passage duct through the connector piece 10. Said bellows 6 at one end is connected in a vacuum-tight manner to the connector piece 10 by way of an annular connecting piece 13, wherein a seal ring, not visible in the figures, is disposed between the connector piece 10 and the connecting piece 13. At the other end, the bellows 6 is connected in a vacuum-tight manner to the valve rod 4. A scape seal ring having at least one seal ring could also be provided instead of a bellows for sealing.

Figure 5:
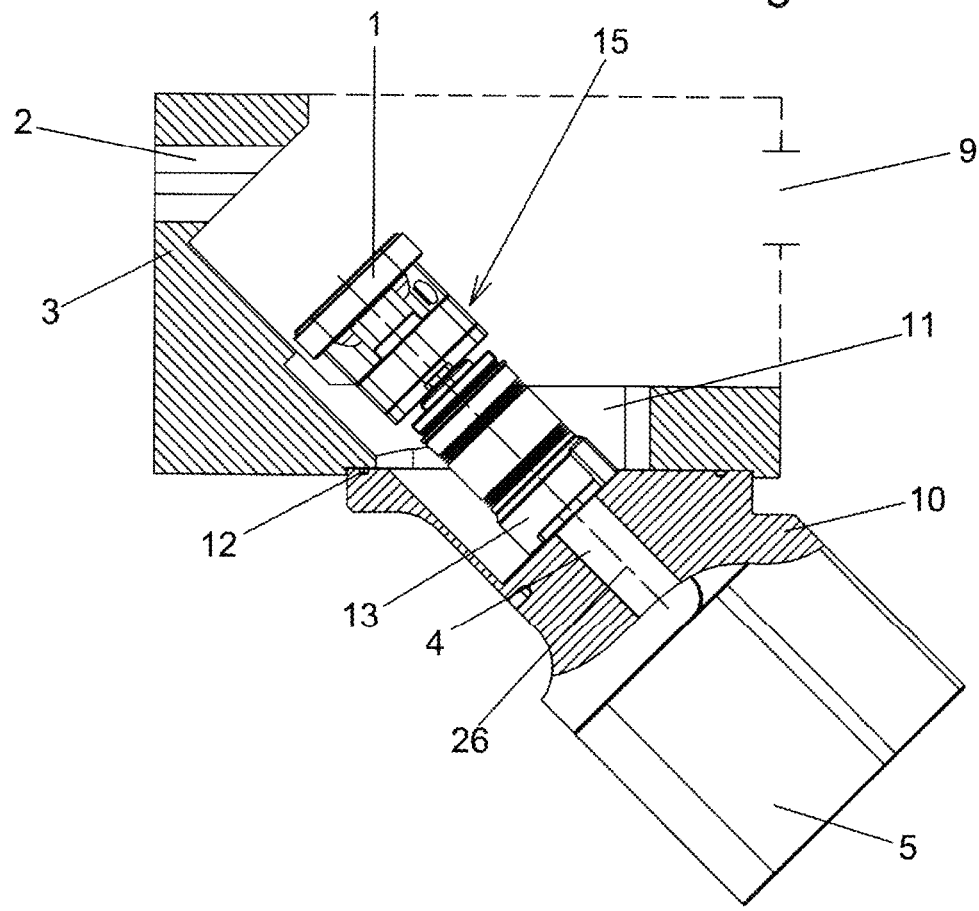
FIG. 5 shows a section along the line A-A of FIG. 4.
Figure 6:
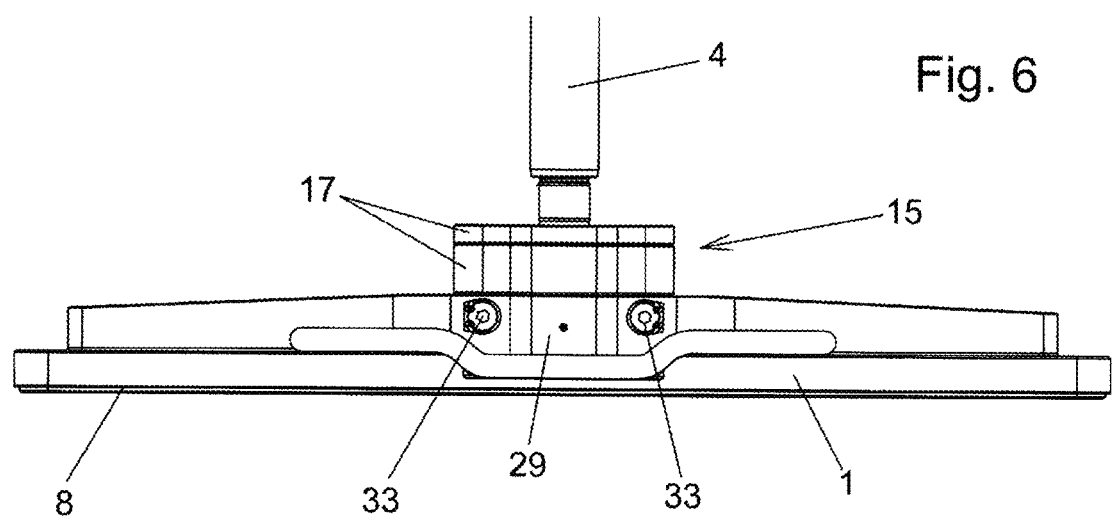
FIG. 6 shows a lateral view of the front end of the valve rod, having the valve plate connected to the valve rod by way of the connecting device.
Figure 11:
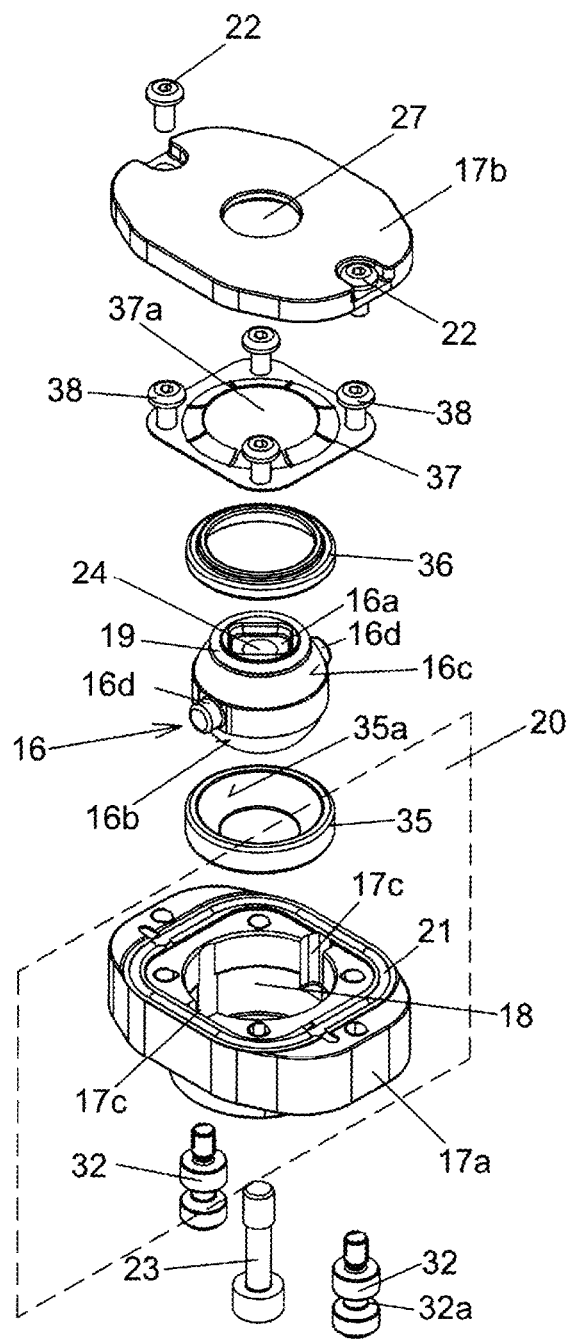
FIGS. 11 and 12 show exploded illustrations of the connecting device viewed from different angles.
Figure 12:
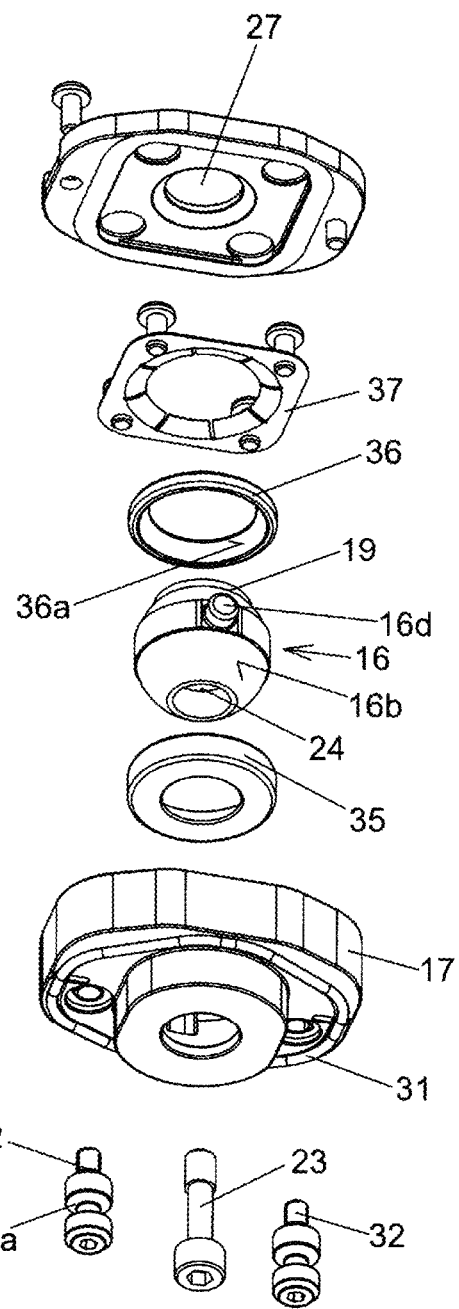

In a modified embodiment, the closure device which is configured as illustrated in FIGS. 1 to 4, thus configured as in FIG. 5 without the dashed lines, could also be attached to the external side of a wall of a vacuum chamber, wherein the opening 2 is co-aligned with an opening in this wall of the vacuum chamber, and the wall 3 in the region surrounding the opening 2 is sealed in relation to the wall of the vacuum chamber. In such an application, the closure device may also be referred to as a door.

In yet another embodiment, the wall 3 having the opening 2 could also be part of a vacuum chamber. This vacuum chamber thus possesses a further opening, corresponding to the opening 11 illustrated in the figures, through which the valve rod 4 is guided out of the interior of the vacuum chamber, and which is closed by the connector piece 10, wherein the drive 5 is again attached to the connector piece, and the valve rod extends through a passage duct in the connector piece. The valve rod can in turn be guided into the vacuum region of the vacuum chamber so as to be sealed by means of a bellows (or by means of a scape seal ring). In this embodiment, the wall 3 having the opening 2 thus does not form part of the closure device according to the invention.

In yet another embodiment, the wall 3 having the opening 2 could also be disposed on the inside of a wall of a vacuum chamber, wherein the opening 2 of the wall 3 is co-aligned with the opening in the wall of the vacuum chamber. Such a closure device may also be referred to as an "insert". The valve rod 4 here would again preferably be guided out of the vacuum chamber in a sealed manner, so that the drive 5 lies outside the vacuum region of the vacuum chamber.

The valve plate 1 is configured with a substantially rectangular circumferential contour. "Substantially rectangular" here means that the valve plate is configured so as to be rectangular with radiused corners.

The opening 2 possesses a corresponding contour and is surrounded by the seal face 14 against which the seal ring 8 is pressed in the closed position of the valve plate 1.

A connecting device 15 serves for connecting the valve rod 4 to the valve plate 1. Said connecting device 15 has a swivel head 16 which is disposed in the inner receptacle space 18 of a joint body 17.

In the exemplary embodiment, the swivel head 16 is rigidly connected to the valve rod 4, and the joint body 17 is rigidly connected to the valve plate 1, as is preferable.

The joint body 17 comprises a socket part 17a which possesses a socket-shaped depression, and a cap part 17b which closes the socket part. The inner receptacle space 18 is thus configured at least substantially by the socket-shaped depression of the cap part 17b. The cap part 17b is sealed in relation to the socket part 17a by an annular seal 21 which is disposed between the socket part 17a and the cap part 17b. The connection between the cap part 17b and the socket part 17a is established by screws 22.

The connection between the valve rod 4 and the swivel head 16 is established by means of a connecting screw 23 which penetrates a central through bore 24 through the swivel head 16 and is screwed into a threaded bore 25 on the end of the valve rod 4 that is proximal to the end face. The valve rod here possesses a connecting portion 4a having an at least substantially square cross section, and the swivel head 16 possesses a depression 16a having a corresponding external contour into which the connecting portion 4a of the valve rod 4 protrudes. In this way, the valve rod 4 is rotationally secured in relation to the swivel head in terms of a rotation of the swivel head 16 in relation to the valve rod 4 about the longitudinal axis 26 of the valve rod 4. Any other polygonal contour, or any other contour deviating from the circular shape, for example an oval contour or a star-shaped contour, could also be provided instead of a square contour. However, an anti-rotation safeguard could also be configured in another way.

The cap part 17b possesses a window opening 27 through which the valve rod 4 protrudes in the region of an end portion. In a central position of the connecting device, in which the valve plate 1 is aligned so as to be orthogonal to the longitudinal axis 26 of the valve rod 4 (i.e. the central plane of the valve plate 1 is orthogonal to the longitudinal axis 26), there is an annular gap s present between the valve rod 4 and the periphery of the window opening 27 in the cap part 17b, i.e. the valve rod 4 about its entire circumference is spaced apart, preferably uniformly, from the periphery of the window opening 27. As a result, proceeding from the central position, (limited) pivoting of the valve plate 1 about an arbitrary axis orthogonal to the longitudinal axis 26 of the valve rod 4 is made possible, as will yet be explained in more detail.

For connecting the joint body 17 to the valve plate 1, a connecting portion 29 disposed on the rear side of the valve plate 1 has a depression 30. The socket part 17a possesses a projecting portion which is insertable into the depression 30. Situated between this projecting portion of the socket part 17a and the adjoining portion is a step on which an annular seal 31 is disposed, the latter in the connected state being pressed against a surface of the connecting portion 29 that surrounds the depression 30. The depression 30 of the connecting portion 29 possesses opposite lateral extensions. Connecting pins 32, which are screwed into threaded bores in the outside of the socket part 17a in the region of the step, protrude into said lateral extensions. The shank of a respective connecting pin 32 possesses a constriction 32a. Fastening bolts 33, which are inserted into bores 34 of the connecting portion 29 that extend transversely to the connecting pins 32, protrude into these constrictions, wherein the bores 34 open into the regions of the lateral extensions of the depression 30.

The connecting portion 29 is part of a transverse beam which on both sides of the connecting portion 29 is connected to the plate part of the valve plate, and in the intervening region is spaced apart from the plate part of the valve plate. If the wall 3, which has the opening 2, possesses a certain curvature (in terms of the direction of the longitudinal extent of the valve plate), the valve plate 1 can adapt to this curvature within a specific range as a result. Uniform compression of the seal ring 8 is additionally facilitated as a result.

A first and a second joint socket part 35, 36 are disposed in the receptacle space 18 of the joint body 17. The joint socket parts 35, 36 possess in each case a concave joint face 35a, 36a. This concave joint face 35a, 36a has in each case the shape of a portion of a spherical internal surface. The concave joint faces 35a, 36a of the joint socket parts 35, 36 are placed on the swivel head 16 from opposite sides, and interact with respectively assigned convex joint faces 16b, 16c of the swivel head 16. The convex joint faces 16b, 16c are in each case configured in the shape of a portion of a spherical surface, and represent in each case a portion of the external surface of the swivel head 16. In particular, a respective convex joint face 16b, 16c has the shape of the radially outer surface of a spherical disk (=spherical layer), thus possessing the shape of a so-called spherical zone. Accordingly, the concave joint faces 35a, 36a have in each case the shape of a spherical internal surface of a hollow spherical disk. In this way, the joint socket parts 35, 36 have at least substantially the shape of hollow spherical disks. The central planes of the joint socket parts 35, 36 here are orthogonal to the longitudinal axis 26 of the valve rod 4. In the central position, the central planes of the spherical disk-shaped portions of the swivel head 16 that form the convex joint faces 16b, 16c thus also lie in planes that are orthogonal to the longitudinal axis 26.

The joint socket parts 35, 36 are pressed against the swivel head 16 by a spring-elastic element 37. In the exemplary embodiment, this spring-elastic element 37 is formed by a spring disk which is disposed adjacent to the cap part 17b and in the region of the window opening 27 of the cap part has an opening 37a. The spring-elastic element 37 is screwed to the socket part 17a by means of screws 38. Said spring-elastic element in the region adjoining the opening 37a has incisions, and the segments cut off by the incisions are bent upward. In this region, the spring-elastic element 37 bears on the second joint socket part 36 and presses the latter against the swivel head 16, as a result of which the swivel head 16 is pressed against the first joint socket part 35 which bears on a base area on the base of the socket-shaped depression in the socket part 17a.

As a result, the swivel head is held in a friction-fitting manner in the currently prevailing position. This friction-fit is so strong that the weight of the valve plate 1 can also be absorbed without the position of the swivel head 16 being altered as a result, specifically independently of the spatial orientation of the closure device.

The opening 37a of the spring-elastic element 37 is larger than the window opening 27 of the cap part 17b. In this way, a seal ring 19 disposed on the swivel head 16, in a region surrounding the depression 16a, can penetrate the opening 37a of the spring-elastic element 37, and in a region surrounding the window opening 27 can be pressed against the inside of the cap part 17b. Conversely, as shown on FIG. 14, the seal ring 19 could also be attached to the inside of the cap part 17b and, through the opening 37a, be pressed against the surface of the swivel head 16, specifically in a region surrounding the depression 16a.

The swivel head 16 has projecting studs on opposite sides. The studs 16d project in each case in a direction which is orthogonal to the longitudinal axis 26, whereby the studs 16d lie so as to be mutually coaxial. A respective stud 16d protrudes into a respectively assigned groove 17c in the socket part 17a of the joint body 17. A respective one of the grooves 17c is configured in a wall delimiting the socket-shaped depression, i.e. extends this socket-shaped depression of the socket part 17a. The grooves 17c here extend in a plane 20 (plotted in FIG. 11) which in the central position of the connecting device lies parallel to the longitudinal axis 26 of the valve rod 4. In the exemplary embodiment, the grooves 17c in the central position of the connecting device run so as to be rectilinear and parallel to the longitudinal axis 26 of the valve rod 4. The internal wall which delimits the socket-shaped depression of the socket part 17a could also be configured to be curved in relation to the direction parallel to the valve rod, so that the grooves 17c would extend in a correspondingly curved manner.

The studs 16d emanate from an annular region of the external surface of the swivel head 16 that lies between the joint faces 16b, 16c of the swivel head 16. Said studs 16d are in particular situated on the equator of the swivel head 16, whereby the equator of the swivel head 16 lies in an equator plane that is orthogonal to the longitudinal axis 26 of the valve rod 4 and penetrates the swivel head 16 in the center.

Figure 13:
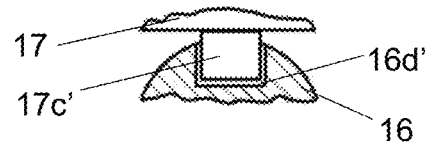
FIG. 13 shows a partial schematic view similar to a portion of FIG. 9 illustrating an alternate configuration of the connecting device showing the at least one projecting stud on the joint body protruding into a groove on the swivel head.
Figure 14:
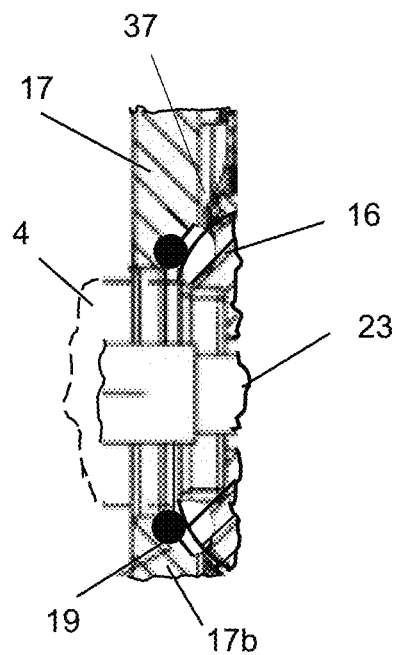
FIG. 14 shows a partial schematic view similar to a portion of FIG. 9 illustrating an alternate configuration of the connecting device in which the seal ring is disposed in a region that surrounds the opening of the cap part and bears on the swivel head.

FIG. 13 shows a schematic view of a portion of FIG. 9 with an alternate configuration in which at least one projecting stud 17c' is on the joint body 17 and protrudes into an assigned groove 16d' which is disposed on the swivel head 16 and which in a central position of the connecting device, in which the valve plate is aligned so as to be orthogonal to the longitudinal axis 26 (shown in FIG. 9) of the valve rod 4 (shown in FIG. 9), extends in a plane that lies parallel to the longitudinal axis of the valve rod 4.

As a result of the studs interacting with the grooves, the swivel head 16 is blocked in terms of rotating in relation to the joint body 17 about the longitudinal axis 26 of the valve rod 4. However, the swivel head 16 can be tilted about an arbitrary axis that is orthogonal to the longitudinal axis 26 of the valve rod 4 (until the annular gap S has been used up).

In this way, the connecting device forms a ball joint which is blocked in terms of a rotation about an axis that is orthogonal to the equator plane of the swivel head 16, thus about that longitudinal axis 26 of the valve rod 4 connected to the swivel head.

Since concave joint faces 35a, 36a, which interact with the swivel head 16 beyond the equator of the latter, interact with the convex joint faces 16b, 16c of the swivel head 16, the joint configured by the connecting device can also be referred to as a ball-and-socket joint which is blocked in terms of a rotation about an axis that is orthogonal to the equator plane of the swivel head 16, thus about the longitudinal axis 26 of the valve rod 4 connected to the swivel head.

As a result of the receptacle space 18 being sealed by the seal 21 between the cap part 17b and the socket part 17a, and the seal ring 19 between the cap part 17b and the swivel head 16, and since the socket part 17a is furthermore sealed in relation to the connecting portion 29 by means of the seal 31, particles which are created in particular in the movement of the swivel head 16 in relation to the joint socket parts 35, 36, cannot make their way into the space surrounding the connecting device and the valve plate.

LIST OF REFERENCE SIGNS

1 Valve plate
2 Opening
3 Wall
4 Valve rod
4a Connecting portion
5 Drive
6 Bellows
8 Seal ring
9 Opening
10 Connector piece
11 Opening
12 Seal
13 Connecting piece
14 Seal face
15 Connecting device
16 Swivel head
16a Depression
16b Joint face
16c Joint face
16d Stud
17 Joint body
17a Socket part
17b Cap part
17c Groove
18 Receptacle space
19 Seal ring
20 Plane
21 Seal
22 Screw
23 Connecting screw
24 Through bore
25 Threaded bore
26 Longitudinal axis
27 Window opening
29 Connecting portion
30 Depression
31 Seal
32 Connecting pin
32a Constriction
33 Fastening bolt
34 Bore
35 Joint socket part
35a Joint face
36 Joint socket part
36a Joint face
37 Spring-elastic element
37a Opening
38 Screw

The invention claimed is:

1. A closure device for closing an opening in a wall in a vacuum-tight manner, the closure device comprising:
a valve plate which is adjustable between a closed position in which the valve plate seals the opening and an opened position in which the valve plate exposes the opening;
a connecting device that connects the valve plate to a valve rod that has a longitudinal axis, the connecting device has a swivel head of which at least portions of an external surface thereof have a spherical configuration and which is disposed in a receptacle space of a joint body; and
for blocking a rotation of the swivel head about the longitudinal axis of the valve rod, at least one projecting stud disposed on the swivel head or on the joint body protrudes into an assigned groove which is disposed in an other of the swivel head or the joint body and which in a central position of the connecting device, in which the valve plate is aligned so as to be orthogonal to the longitudinal axis of the valve rod, extends in a plane that lies parallel to the longitudinal axis of the valve rod.

2. The closure device as claimed in claim 1, wherein disposed on opposite sides of the swivel head or of the joint body is in each case one said projecting stud which engages in one respectively assigned one of the grooves in the other one of the swivel head or the joint body.

3. The closure device as claimed in claim 1, wherein the joint body has a socket part, which includes a socket-shaped depression, and a cap part, and the cap part is sealed in relation to the socket part by an intervening seal.

4. The closure device as claimed in claim 3, wherein an end portion of the valve rod penetrates an opening in the cap part of the joint body, and an annular gap is present between the valve rod and a periphery of the opening in the cap part in the central position of the connecting device.

5. The closure device as claimed in claim 3, further comprising a seal ring, which in a region surrounding an opening of the cap part bears on an inside of the cap part is disposed on the swivel head, or the seal ring which bears on the swivel head is disposed in a region surrounding the opening of the cap part on the inside of the cap part.

6. The closure device as claimed in claim 1, wherein the valve rod is connected to the swivel head and the valve plate is connected to the joint body.

7. The closure device as claimed in claim 6, wherein the valve rod is connected to the swivel head by a connecting screw which penetrates a central through bore through the swivel head and is screwed into a threaded bore on an end of the valve rod that is proximal to an end face.

8. The closure device as claimed in claim 7, wherein a connecting portion of the valve rod has a cross section that deviates from a circular shape, and the swivel head has a depression with a corresponding external contour into which the end portion of the valve rod protrudes, and the valve rod is rotationally secured in relation to the swivel head with respect to rotating about the longitudinal axis of the valve rod.

9. The closure device as claimed in claim 1, wherein the swivel head has mutually spaced apart convex joint faces which are in each case formed by a portion of the external surface of the swivel head configured with a shape of a portion of a spherical surface, and between which the at least one stud is disposed.

10. The closure device as claimed in claim 9, wherein the convex joint faces of the swivel head each have the shape of a spherical zone.

11. The closure device as claimed in claim 9, wherein a first and a second joint socket part are disposed in the receptacle space of the joint body and have in each case a concave joint face in a shape of a portion of a spherical internal surface, and the concave joint faces of the joint socket parts interact in each case with an assigned one of the convex joint faces of the swivel head.

12. The closure device as claimed in claim 11, wherein the first joint socket part bears on a base face of a socket part of the joint body, and the second joint socket part is placed on that side on the swivel head that lies opposite the first joint socket part.

13. The closure device as claimed in claim 11, wherein the first and second joint socket parts are pressed against the swivel head by at least one spring-elastic element.

14. The closure device as claimed in claim 13, wherein the spring-elastic element is a spring steel sheet which lies adjacent to a cap part of the joint body and which on a side distal from the cap part is pressed against the second joint socket part, and the spring steel sheet has an opening in a region of an opening of the cap part.

15. The closure device as claimed in claim 14, further comprising a seal ring, which is disposed on the swivel head and in a region surrounding the opening of the cap part bears on an inside of the cap part, or is disposed in a region that surrounds the opening of the cap part on the inside of the cap part and bears on the swivel head, protrudes through the opening of the spring steel sheet.

* * * * *